(12) United States Patent
Kim et al.

(10) Patent No.: US 11,569,911 B2
(45) Date of Patent: Jan. 31, 2023

(54) MULTI-QUIET ZONE-BASED OPTICAL NETWORK UNIT REGISTRATION METHOD FOR LOW-LATENCY SERVICE

(71) Applicant: ELECTRONICS AND TELECOMMUNICATIONS RESEARCH INSTITUTE, Daejeon (KR)

(72) Inventors: Kwang Ok Kim, Jeonju-si (KR); Kyeong Hwan Doo, Daejeon (KR); Jung-yeol Oh, Sejong-si (KR); Han Hyub Lee, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/367,944

(22) Filed: Jul. 6, 2021

(65) Prior Publication Data
US 2022/0123837 A1 Apr. 21, 2022

(30) Foreign Application Priority Data
Oct. 19, 2020 (KR) .......................... 10-2020-0135187

(51) Int. Cl.
*H04B 10/27* (2013.01)
(52) U.S. Cl.
CPC .................................... *H04B 10/27* (2013.01)

(58) Field of Classification Search
CPC ................. H04B 10/27; H04Q 11/0066; H04J 14/0249; H04J 14/0247
See application file for complete search history.

(56) References Cited

U.S. PATENT DOCUMENTS

| 7,633,866 B2 | 12/2009 | Han et al. |
| 10,205,524 B2 | 2/2019 | Kim et al. |
| (Continued) | | |

FOREIGN PATENT DOCUMENTS

| JP | 2013-258559 A | 12/2013 |
| JP | 2020-502952 A | 1/2020 |

OTHER PUBLICATIONS

Jun Li et al., "Adaptive Registration in TWDM-PON with ONU Migrations", vol. 6, No. 11, Nov. 2014, J. Opt. Commun. Netw.

*Primary Examiner* — Dzung D Tran
(74) *Attorney, Agent, or Firm* — LRK Patent Law Firm

(57) ABSTRACT

Disclosed is a method of registering a new optical network unit (ONU) to be performed by an optical line terminal (OLT). The method includes transmitting a ranging notification message to a centralized unit (CU)/distributed unit (DU) to register the new ONU, receiving scheduling information for registering the new ONU from the CU/DU in response to the ranging notification message, transmitting a serial number request message to a service region in which ONUs are present based on the received scheduling information, and when the serial number response message is received from the new ONU in response to the serial number request message, registering the new ONU that transmits a serial number request message. The transmitting of the serial number request message is performed through a multi-quiet zone of a short period.

12 Claims, 9 Drawing Sheets

(56) References Cited

U.S. PATENT DOCUMENTS

| | | | | |
|---|---|---|---|---|
| 2010/0272259 A1* | 10/2010 | Kim | .................... | H04L 63/0236 380/282 |
| 2014/0178072 A1* | 6/2014 | Yoo | .................... | H04Q 11/0067 398/66 |
| 2018/0316436 A1 | 11/2018 | Gao et al. | | |
| 2019/0273975 A1* | 9/2019 | Lin | .................... | H04Q 11/0067 |
| 2022/0264203 A1* | 8/2022 | Ma | .................... | H04Q 11/0067 |

* cited by examiner

| Zone ID | Dis. (Km) | QZ (μs) | D (μs) | QZ RT (μs) |
|---|---|---|---|---|
| 0 | 1 ~ 20 | 1022 | 0 | 0 ~ 250 |
| 1 | 1 ~ 5 | 1017 | 0 | 0 ~ 101 |
| 2 | 5 ~ 10 | 1018 | 50 | 49 ~ 151 |
| 3 | 10 ~ 15 | 1019 | 100 | 99 ~ 201 |
| 4 | 15 ~ 20 | 1020 | 150 | 149 ~ 250 |

MULTI-QUIET ZONE-BASED OPTICAL NETWORK UNIT REGISTRATION METHOD FOR LOW-LATENCY SERVICE

CROSS-REFERENCE TO RELATED APPLICATION(S)

This application claims the benefit of Korean Patent Application No. 10-2020-0135187 filed on Oct. 19, 2020, in the Korean Intellectual Property Office, the disclosure of which is incorporated herein by reference.

BACKGROUND

1. Field of the Invention

One or more example embodiments relate to a multi-quiet zone-based optical network unit (ONU) registration method for a low-latency service, and more particularly, to a method of registering an ONU using a multi-quiet zone of a short period to guarantee low-latency required in a wireless section when a wired service and a wireless service are concurrently received in a passive optical network (PON).

2. Description of Related Art

Recently, there is a growing demand for concurrently receiving a wired service and a wireless service through a passive optical network (PON) which is already widely deployed to spread 5th Generation (5G) services. Thus, in line with the growing demand, the International Telecommunication Union-Telecommunications Standardization Sector (ITU-T) is developing a standard for a cooperative dynamic bandwidth allocation (CO-DBA). The O-RAN Alliance, a world-wide community of operators operating in the radio access network (RAN) industry, has standardized a cooperative transport interface (CTI) with a matching interface between a 5G centralized unit (CU)/distributed unit (DU) device and an optimal line terminal (OLT) device.

In a typical PON technology, a 250 microseconds (s) quiet zone used to register an optical network unit (ONU) may not satisfy a latency standard required for 5G wireless services. An OLT may be matched with a 5G DU device through an Fx interface, and provide corresponding services to ONUs for a wired service and ONUs for a wireless service. The ONUs for the wireless service may be matched with a 5G radio unit (RU) device through the Fx interface. For the Fx interface, an enhanced common public radio interface (eCPRI) may be used.

However, to receive a wireless service in a PON, a 150 μs latency condition may need to be guaranteed. Thus, a 250 μs quiet zone used to register an ONU in a typical PON may lead to a delay in the reception of a wireless service. Accordingly, there is a desire for a low-latency ONU registration method of an OLT that may guarantee a latency requirement for a 5G wireless service.

SUMMARY

An aspect provides an optical network unit (ONU) registration method that may perform an ONU registration process by a collaboration between a wireless device and a passive optical network (PON) device in an environment where a wired service and a wireless service are concurrently provided through a single PON, and guarantee the same delay time through a short 102 μs-unit multi-quiet zone regardless of an ONU distance.

Another aspect also provides mutual coexistence between ONUs that use a multi-quiet zone and legacy ONUs that do not use the multi-quiet zone in a single PON.

According to an aspect, there is provided a method of registering an ONU to be performed by an OLT, the method including transmitting a ranging notification message to a centralized unit (CU)/distributed unit (DU) to register the new ONU, receiving scheduling information for registering the new ONU from the CU/DU in response to the ranging notification message, transmitting a serial number request message to a service region in which ONUs are present based on the received scheduling information, and when a serial number response message is received from the new ONU in response to the serial number request message, registering the new ONU that transmits the serial number response message. The transmitting of the serial number request message is performed through a multi-quiet zone of a short period.

Each quiet zone in the multi-quiet zone may include a minimum response time variation of an ONU, a random delay time, an optical fiber transmission time, and a distance variation time for adjusting a variation that is based on a distance of the ONU.

The CU/DU may provide the scheduling information such that a radio unit (RU) does not transmit data to the OLT in a quiet zone interval in which registration of the new ONU is performed.

The serial number request message may include an identifier (ID) for identifying the service section that is classified based on a distance, and the new ONU present in the service region may transmit the serial number response message to the OLT in response to the serial number request message including the ID corresponding to a location of the new ONU.

When the serial number request message is received from the OLT, the new ONU may transmit the serial number response message to the OLT after a minimum response time and a random delay time.

The registering of the new ONU may include allocating an identifiable ID to the new ONU that transmits the serial number response message, and completing the registering of the new ONU by measuring a distance to the new ONU to which the ID is allocated and allocating an adjusted value.

According to another aspect, there is provided an OLT including a processor, and the processor may transmit a ranging notification message to a CU/DU to register an ONU, receive scheduling information for registering the new ONU from the CU/DU in response to the ranging notification message, transmit a serial number request message to a service region in which ONUs are present based on the scheduling information, and when a serial number response message is received from the new ONU in response to the serial number request message, register the new ONU that transmits the serial number response message and transmit the serial number request message through a multi-quiet zone of a short period.

Each quiet zone in the multi-quiet zone may include a minimum response time variation, a random delay time, an optical fiber transmission time of the ONU, and a distance variation time for adjusting a variation that is based on a distance of the ONU.

The CU/DU may provide the scheduling information such that a RU does not transmit data to the OLT in a quiet zone interval in which registration of the new ONU is performed.

The serial number request message may include an ID for identifying the service region that is classified based on a distance, and the new ONU present in the service region may transmit the serial number response message to the OLT in response to the serial number request message including the ID corresponding to a location of the new ONU.

When the serial number request message is received from the OLT, the new ONU may transmit the serial number response message to the OLT after a minimum response time and a random delay time.

The processor may allocate an identifiable ID to the new ONU that transmits the serial number response message, and complete the registering of the new ONU by measuring a distance to the new ONU to which the ID is allocated and allocating an adjusted value.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
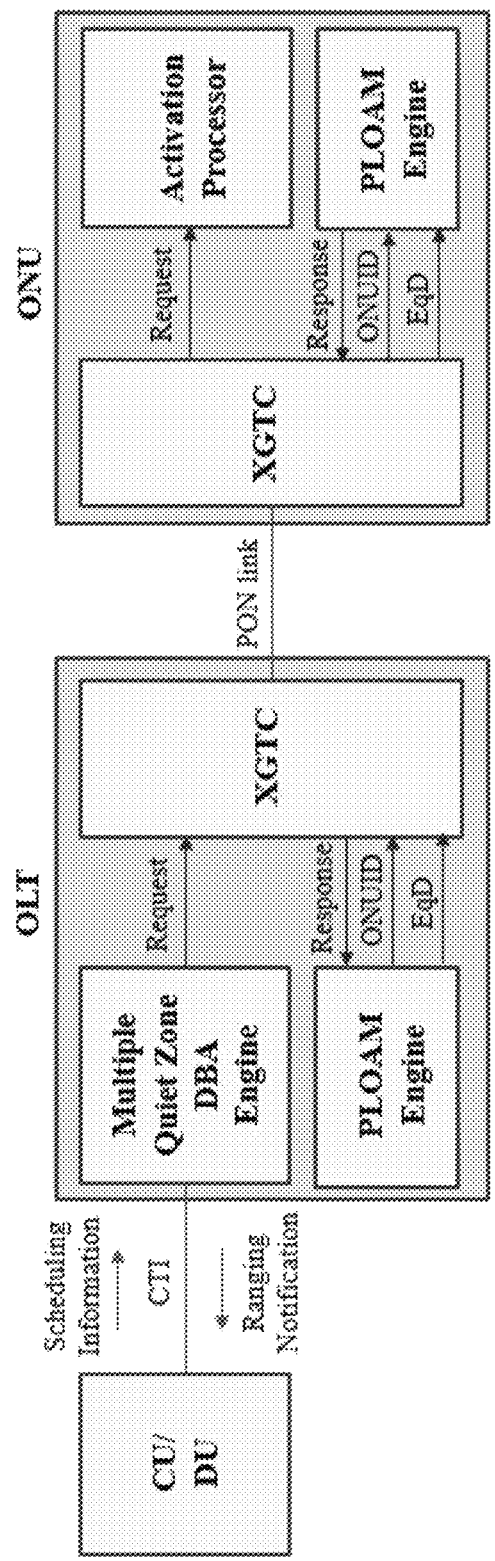
FIG. 1 is a diagram illustrating a configuration for guaranteeing low-latency according to an example embodiment.

FIG. 1 is a diagram illustrating a configuration for guaranteeing low-latency according to an example embodiment.

Referring to FIG. 1, an optical line terminal (OLT) may include a multi-quiet zone dynamic bandwidth allocation (DBA) engine and provide a wireless centralized unit (CU)/distributed unit (DU) device and a cooperative transport interface (CTI), to guarantee low-latency.

The multi-quiet zone DBA engine may configure a plurality of quiet zones with short periods in an existing quiet zone of a 250 microseconds (s) interval based on an optical network unit (ONU) distance. The multi-quiet zone DBA engine may control a service transmission of a radio unit (RU) through the CTI during an ONU activation process.

The multi-quiet zone DBA engine may transmit a ranging notification to the CU/DU device through the CTI before an ONU activation process. The ranging notification may provide a start time of the ONU activation process performed by the OLT and a quiet zone interval. That is, the OLT may notify to the CU/DU in advance the ONU activation time through ranging notification.

The CU/DU device may transmit scheduling information so that data is not transmitted from the RU to the OLT during the quiet zone interval, in accordance with the start time of the ONU activation process that is requested by the OLT. The scheduling information may also be transmitted to the OLT through the CTI.

For the ONU activation process for guaranteeing low-latency, a ranging information collaboration between the OLT and the CU/DU device may be performed. For the ranging information collaboration between the OLT and the CU/DU device, time synchronization between the OLT and the CU/DU device may need to be provided beforehand, which may be provided through the Institute of Electrical and Electronics Engineers (IEEE) 1588 protocol.

Figures 2, 3:
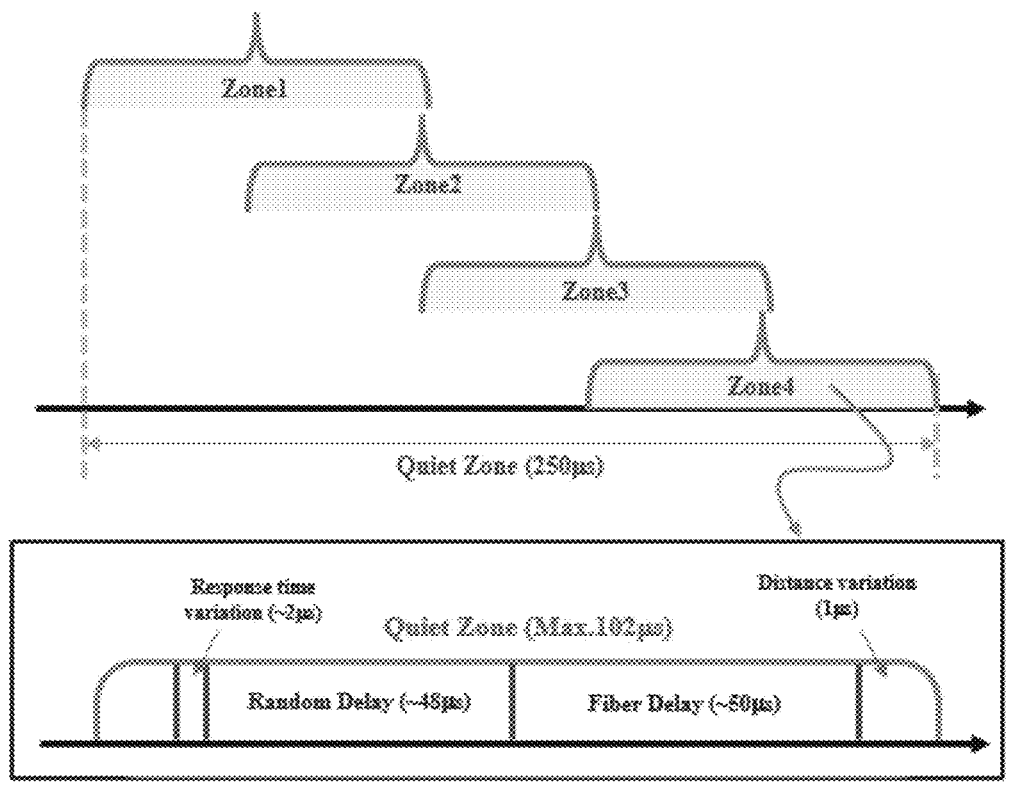
FIG. 2 is a diagram illustrating a method of configuring a multi-quiet zone according to an example embodiment.
FIG. 3 is a diagram illustrating a method of identifying a multi-quiet zone according to an example embodiment.

FIG. 2 is a diagram illustrating a method of configuring a multi-quiet zone according to an example embodiment.

Referring to FIG. 2, a multi-quiet zone may be included in an existing quiet zone of a 250 μs interval. The existing quiet zone may change based on a maximum ONU distance. The multi-quiet zone may be provided in a unit of 5 kilometers (km) and have a maximum quiet window size of 102 μs. The multi-quiet zone may include an ONU minimum response time variation of 2 μs, a maximum random delay time of 48 μs, and a 5 km optical fiber delay time of 50 μs. The multi-quiet zone may also include a distance variation time of 1 μs that is added to both ends to adjust an ONU distance-based variation.

Thus, by providing a 102 μs quiet zone in each 5 km interval, it is possible to guarantee a 150 μs latency that is required for a wireless service.

FIG. 3 is a diagram illustrating a method of identifying a multi-quiet zone according to an example embodiment.

Referring to FIG. 3, a multi-quiet zone may include five quiet zones. In a case in which a zone identifier (ID) value is 0, a 250 μs quiet zone may be used as in a typical passive optical network (PON). This may be used when an ONU that does not use the multi-quiet zone is to be registered in the PON or when a wireless service is not provided in the PON. A zone ID value corresponding to 1 may be used when an ONU that is present at a distance of 0 km to 5 km is discovered, and a zone ID corresponding to 2 may be used when the ONU that is present at a distance of 5 km to 10 km is discovered. A zone ID value corresponding to 3 may be used when an ONU that is present at a distance of 10 km to 15 km is discovered. A zone ID value corresponding to 4 may be used when an ONU that is present at a distance of 15 km to 20 km is discovered. In a case in which a maximum ONU distance exceeds 20 km, the multi-quiet zone may be further expanded.

An ONU-ID value may be used to identify the multi-quiet zone. The ONU-ID value may refer to a unique value that is allocated to an ONU in an ONU activation process. For example, in a case in which a zone ID value is 0 as illustrated in FIG. 3, a value of 1022 may be used as a broadcast ONU-ID in a same manner as previously used. In addition, in a case in which a zone ID value is 1, 2, 3, or 4, respective values 1017, 1018, 1019 and 1020 may be used as broadcast ONU-IDs. The broadcast ONU-ID values may be used in a "serial_number request" map in the ONU activation process, and an ONU may have a broadcast ONU-ID value according to the installed location.

Referring to FIG. 3, the multi-quiet zone may move by 50 µs, and the quiet zone may be opened maximally for a time of 102 µs.

Figure 4:
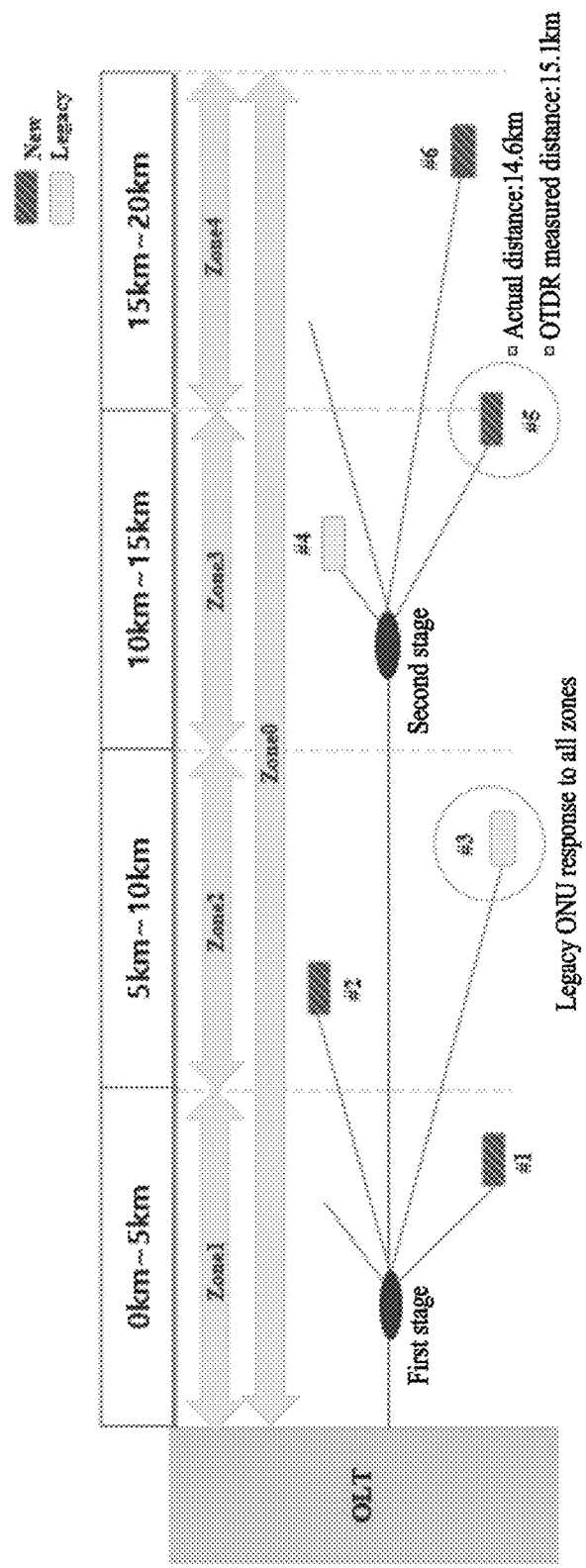
FIG. 4 is a diagram illustrating a configuration of a quiet zone according to an example embodiment.

FIG. 4 is a diagram illustrating a configuration of a quiet zone according to an example embodiment.

Referring to FIG. 4, zone 0 may provide the registration of an ONU at a distance of 0 km to 20 km. Zone 1 may provide the registration of an ONU present at a distance of 0 km to 5 km. ONU #1 present in zone 1 may have 1017 as a broadcast ONU-ID value. Thus, when an OLT attempts to register an ONU in zone 1, ONUs in other zones may not respond.

Zone 2 may provide the registration of an ONU present at a distance of 5 km to 10 km. ONU #2 present in zone 2 may have 1018 as a broadcast ONU-ID value. An existing or legacy ONU, ONU #3, that is present in zone 2 may have 1022 as a broadcast ONU-ID value, as illustrated in FIG. 3. When registering an ONU in zone 2, existing ONU #3 may not respond. Existing ONU #3 and ONU #4 that are present in zone 2 and zone 3, respectively, may only respond in zone 0.

Zone 3 may provide the registration of an ONU present at a distance of 10 km to 15 km. ONU #5 present in zone 3 may have 1019 as a broadcast ONU-ID value. However, in a case in which an actual distance of ONU #5 is 14.6 km, but is recognized as 15.1 km due to an error in distance measurement (or ranging) using an optimal time domain reflectometer (OTDR), ONU #5 may have 1020 as a broadcast ONU-ID value. Thus, an attempt to register ONU #5 in zone 4 may be made, which may be covered by a distance variation included in the multi-quiet zone illustrated in FIG. 2. That is, ONU #5 that is present at a zone boundary due to the actual occurrence of a measurement error may also be normally registered.

As a multi-quiet zone is classified based on an ONU-ID value, existing ONUs and ONUs that use the multi-quiet zone may be present in a single PON as illustrated in FIG. 4. For example, when, in an ONU activation process, all ONUs use 1022 as a broadcast ONU-ID value, and an attempt at the registration in the multi-quiet zone is made by the addition of information to a serial_number request" map and the classification of zones, existing ONU #3 and ONU #4 that are present in zone 2 and zone 3, respectively, may also respond, affecting a normal operation.

Figure 5:
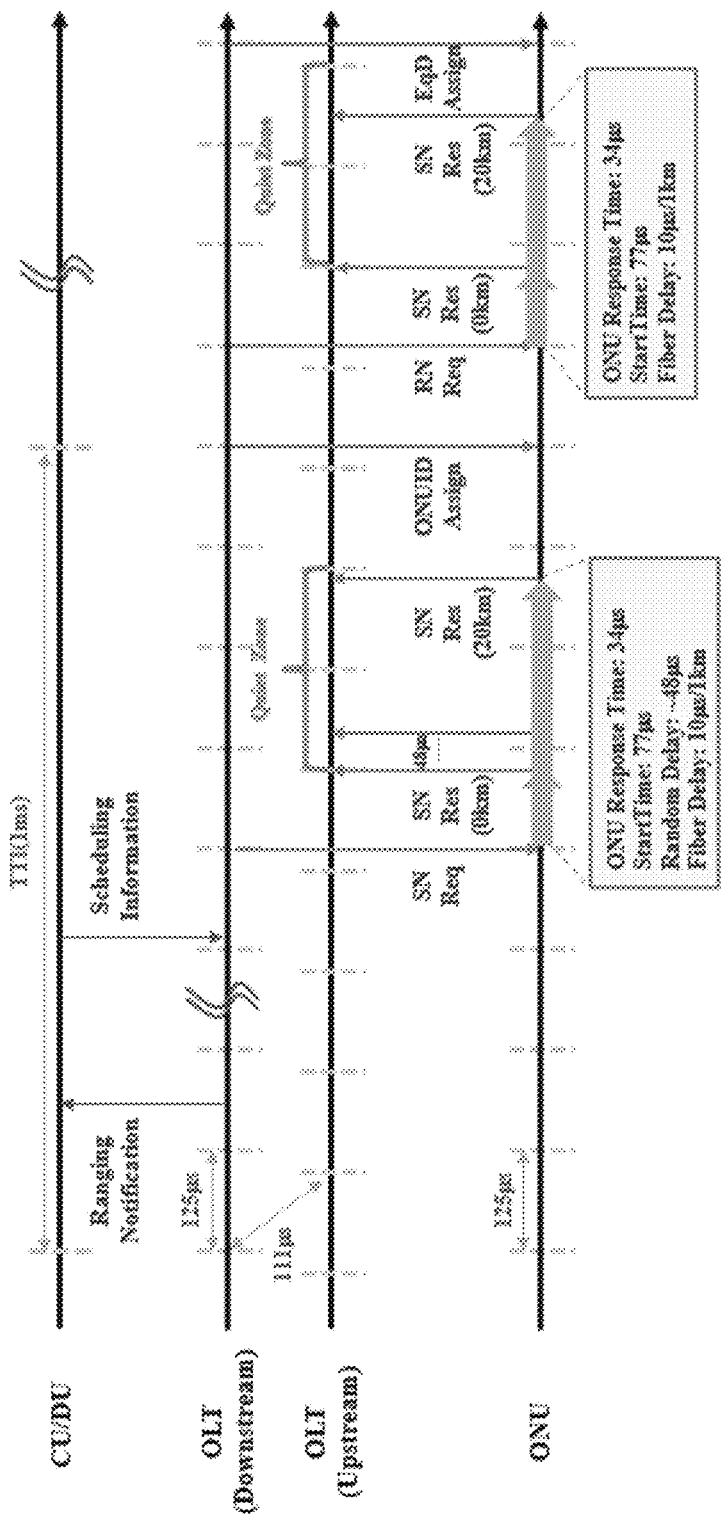
FIG. 5 is a diagram illustrating an optical network unit (ONU) activation process in a multi-quiet zone (or zone 0) according to an example embodiment.

FIG. 5 is a diagram illustrating an ONU activation process in a multi-quiet zone (or zone 0) according to an example embodiment.

Referring to FIG. 5, time synchronization between an OLT and a CU/DU device may need to be provided beforehand to perform an ONU activation process in the OLT. The time synchronization may be provided through the IEEE 1588 protocol. A 125 µs downstream cycle and a 125 µs upstream cycle of the OLT may be set to have a variation of 111 µs. The OLT may use 77 µs as a start time included in a "serial_number request" map, and thus receive a "serial_number response" physical layer operation administration and maintenance (PLOAM) message from an ONU present at a distance of 0 km at the start of the 125 µs upstream cycle of the OLT. That is, the 125 µs upstream cycle may be allowed to start 111 µs later than the downstream cycle, and thus a 250 µs quiet zone may be configured with the two cycles.

Referring to FIG. 5, when an ONU activation process event occurs periodically, the OLT may transmit a ranging notification to the CU/DU device. When the OLT receives scheduling information for RU service from the CU/DU device, the ONU activation process may be performed in accordance with the 125 µs downstream cycle.

For example, the OLT may open the 250 µs quiet zone in a first 125 µs upstream cycle after transmitting a "serial_number request" (SN Req) map to the ONU. When the ONU receives the "serial_number request" (SN Req) map, the ONU may transmit an "acknowledgement" (SN Res) PLOAM message to the OLT after a minimum ONU response time of 34 µs, a start time of 77 µs, and a random delay between 0 µs and 48 µs. This response message may arrive at the OLT, with a variation being between 0 µs and 48 µs by the random delay used in the ONU. For example, when registration of an ONU present at a distance of 20 km is performed, the response message may arrive at the OLT after an optical fiber delay time of 200 µs.

When the OLT receives the "serial_number response" (SN Res) PLOAM message, the OLT may transmit an "Assign_ONUID" (ONUID assign) PLOAM message in accordance with a 125 µs downstream cycle, transmit a "ranging request" (RN Req) map to the ONU in a next 125 µs downstream cycle, and then open the 250 µs quiet zone again in a next 125 µs upstream cycle.

When the ONU receives the "ranging request" (RN Req) map, the ONU may transmit the "acknowledgement" (RN Res) PLOAM message after the minimum ONU response time of 34 µs and the start time of 77 µs. In a case of an ONU present at a distance of 0 km, it may arrive at a start time of a 125 µs upstream cycle. In a case of an ONU present at a distance of 20 km, it may arrive after a 200 µs upstream cycle. When the distance measurement is completed, the OLT may transmit to the ONU an equalized delay (EqD) through an "Assign_EqD" PLOAM.

According to an example embodiment, it is possible to register existing or legacy ONUs by using a 250 µs quiet zone and a broadcast ONU-ID value of 1022 in zone 0. ONUs having ONU-ID values corresponding to zone 1 through 4 may not respond in the quiet zone.

Figure 6:
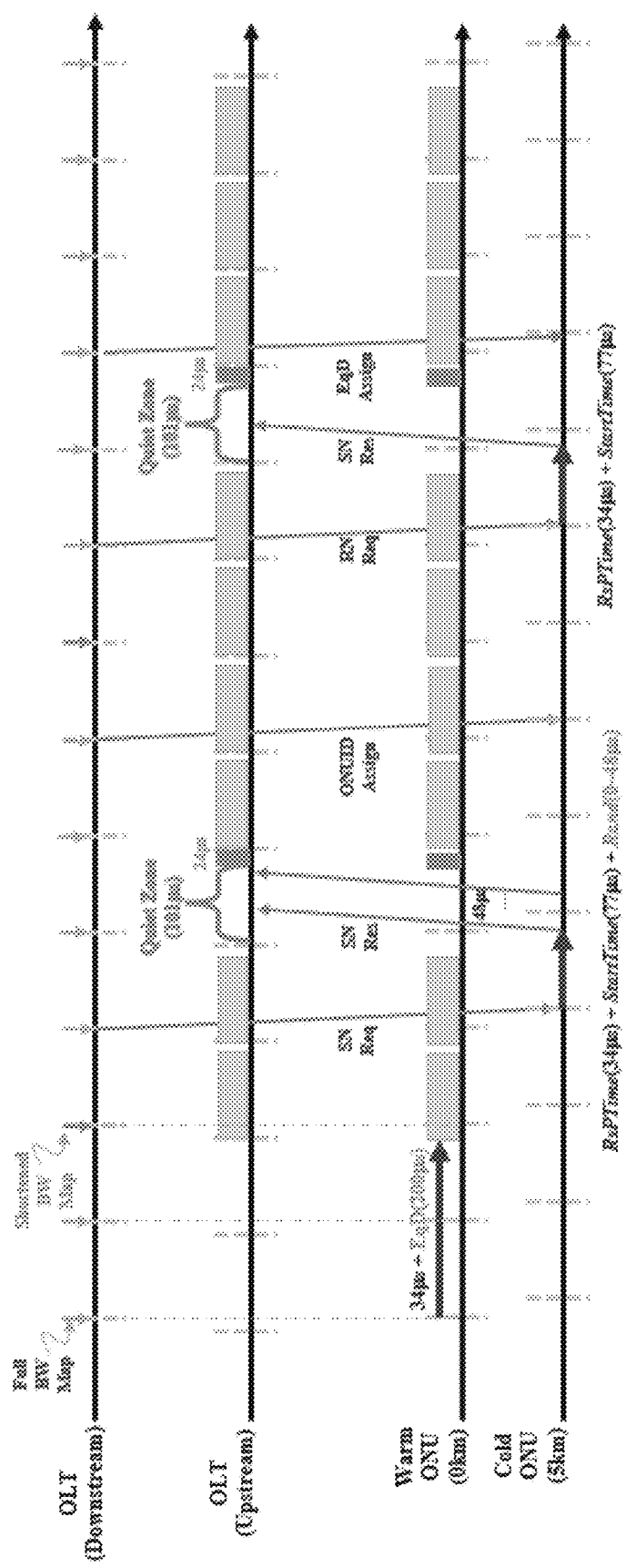
FIG. 6 is a diagram illustrating an ONU activation process in a multi-quiet zone (or zone 1) according to an example embodiment.

FIG. 6 is a diagram illustrating an ONU activation process in a multi-quiet zone (or zone 1) according to an example embodiment.

Referring to FIG. 6, in zone 1, ONUs present at a distance of 0 km to 5 km may be registered. An ONU present at a distance of 0 km may be already registered, and thus have 200 µs allocated by an OLT as an equalized delay (EqD). An ONU that is already registered may be referred to herein as a warm ONU. The OLT may provide a warm ONU with a bandwidth allocation (or a full BW map as illustrated) for each 125 µs period.

For example, to perform an ONU activation process in zone 1, the OLT may allocate a 24 µs transmission bandwidth map (or a shortened BW map as illustrated) to the warm ONU in a cycle before a multi-quiet zone DBA engine transmits a "serial_number request" (SN Req) map. The OLT may transmit the "serial_number request" (SN Req) map and open a quiet zone of a 101 µs length in a next upstream cycle. An ONU that is not registered may transmit a "serial_number response" (SN Res) PLOAM message for a time between 111 µs and 159 µs. An ONU that is not registered may be referred to herein as a cold ONU.

The OLT may receive a response from ONUs that are located at a distance of 0 km to 5 km in the 101 µs quiet zone. When a cold ONU is discovered, the OLT may allocate an ONU-ID through an "Assign_ONUID" (ONUID Assign) PLOAM message. The OLT may allocate a 24 µs transmission bandwidth map (a shortened BW map) to the warm ONU in a cycle before the multi-quiet zone DBA engine transmits a "ranging request" (RN Req) map. The OLT may transmit the "ranging request" (RN Req) map and open a 101 µs quiet zone in a next upstream cycle. The ONU may transmit a "serial_number response" (SN Res) PLOAM message after 111 µs without a random delay. The OLT may measure a distance from a time when the "ranging request" (RN Req) map is transmitted to a time when the "acknowledgement" (RN Res) PLOAM is received. The OLT may then calculate a distance with the cold ONU by subtracting the time of 111 µs from the measured distance. The OLT may transmit an equalized delay (EqD) to the cold ONU using the calculated distance.

As described above, the 101 µs quiet zone may be used to register an ONU in zone 1, and the multi-quiet zone DBA engine may allocate a remaining 24 µs bandwidth (a shortened BW map) of the 101 µs quiet zone and a 125 µs bandwidth (a full BW map) to a warm ONU.

Figure 7:
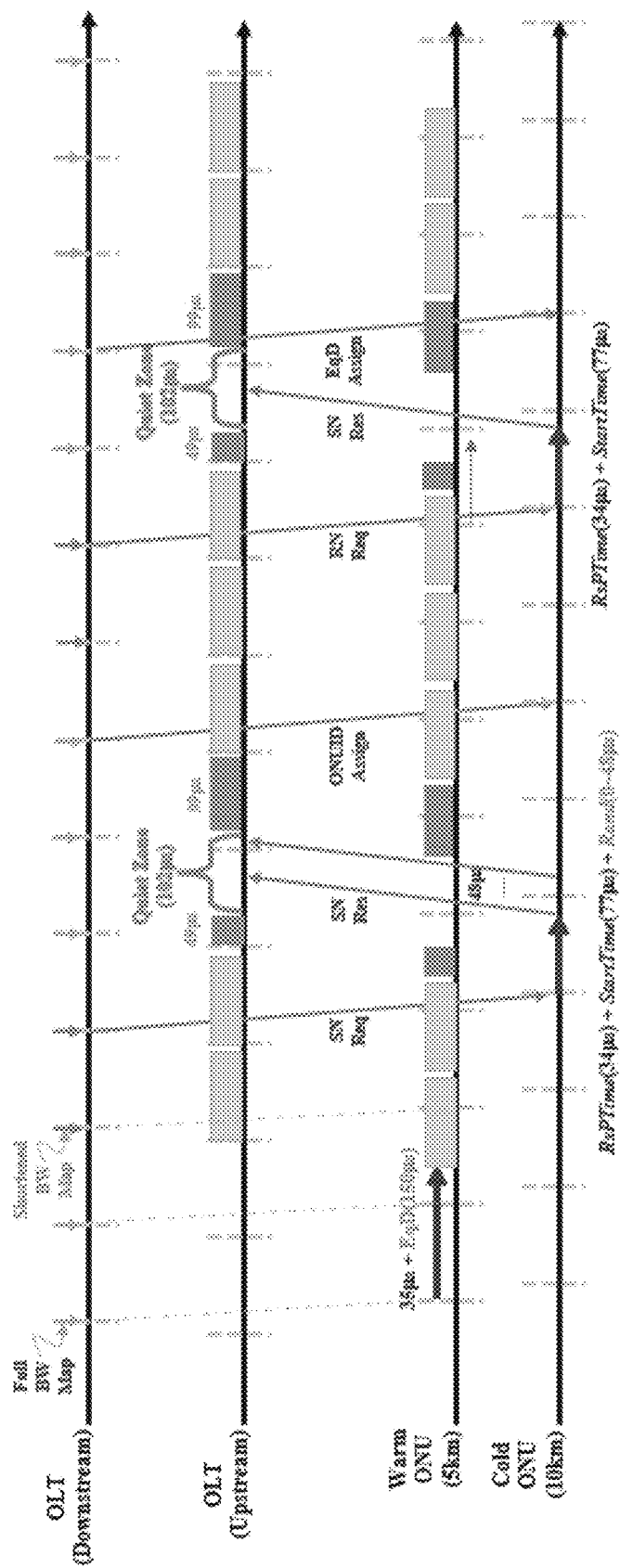
FIG. 7 is a diagram illustrating an ONU activation process in a multi-quiet zone (or zone 2) according to an example embodiment.

FIG. 7 is a diagram illustrating an ONU activation process in a multi-quiet zone (or zone 2) according to an example embodiment.

Referring to FIG. 7, in zone 2, ONUs present at a distance of 5 km to 10 km may be registered. A warm ONU located at a distance of 5 km may be already registered, and thus have 150 µs allocated by an OLT as an equalized delay (EqD). When the warm ONU receives an allocated bandwidth from the OLT, the warm ONU may transmit data to the OLT after 185 µs.

For example, to perform an ONU activation process in zone 2, the OLT may allocate a 49 µs transmission bandwidth map (a shortened BW map) to the warm ONU in a cycle before a multi-quiet zone DBA engine transmits a "serial_number request" (SN Req) map. The OLT may also allocate, to the warm ONU, a 99 µs transmission bandwidth map (a shortened BW map) along with the "serial_number request" (SN Req) map. The OLT may transmit the "serial_number request" (SN Req) map and open a 102 µs quiet zone in a next upstream cycle. An ONU that is not registered may transmit an "acknowledgement" (RN Res) PLOAM message for a time between 111 µs and 159 µs. In a case of a cold ONU that is located at a distance of 10 km, it may be transmitted to the OLT after a 100 µs optical fiber delay. The OLT may discover ONUs located at a distance of 5 km to 10 km by opening the 102 µs quiet zone after 49 µs.

When the cold ONU is discovered, the OLT may allocate an ONU-ID through an "assign_ONUID" (ONUID Assign) PLOAM message. The OLT may allocate the 49 µs transmission bandwidth map (a shortened BW map) to the warm ONU in a cycle before the multi-quiet zone DBA engine transmits a "ranging request" (RN Req) map. The OLT may also allocate, to the warm ONU, a 99 µs transmission bandwidth map (a shortened BW map) along with the "ranging request" (RN Req) map. The OLT may transmit the "ranging request" (RN Req) map and open the quiet zone of a 102 µs length in a next upstream cycle.

The ONU may transmit the "acknowledgement" (RN Res) PLOAM message after 111 µs without a random delay. The OLT may measure a distance from a time when the "ranging request" (RN Req) map is transmitted to a time when the "acknowledgement" (RN Res) PLOAM message is received. The OLT may calculate a distance with the cold ONU by subtracting a time of 111 µs from the measured distance. The OLT may transmit an equalized delay (EqD) to the cold ONU using the calculated distance value.

As described above, the 102 µs quiet zone may be used to register an ONU in zone 2, and the multi-quiet zone DBA engine may additionally allocate the 49 µs and 99 µs bandwidth maps (shortened BW maps) in the quiet zone.

Figure 8:
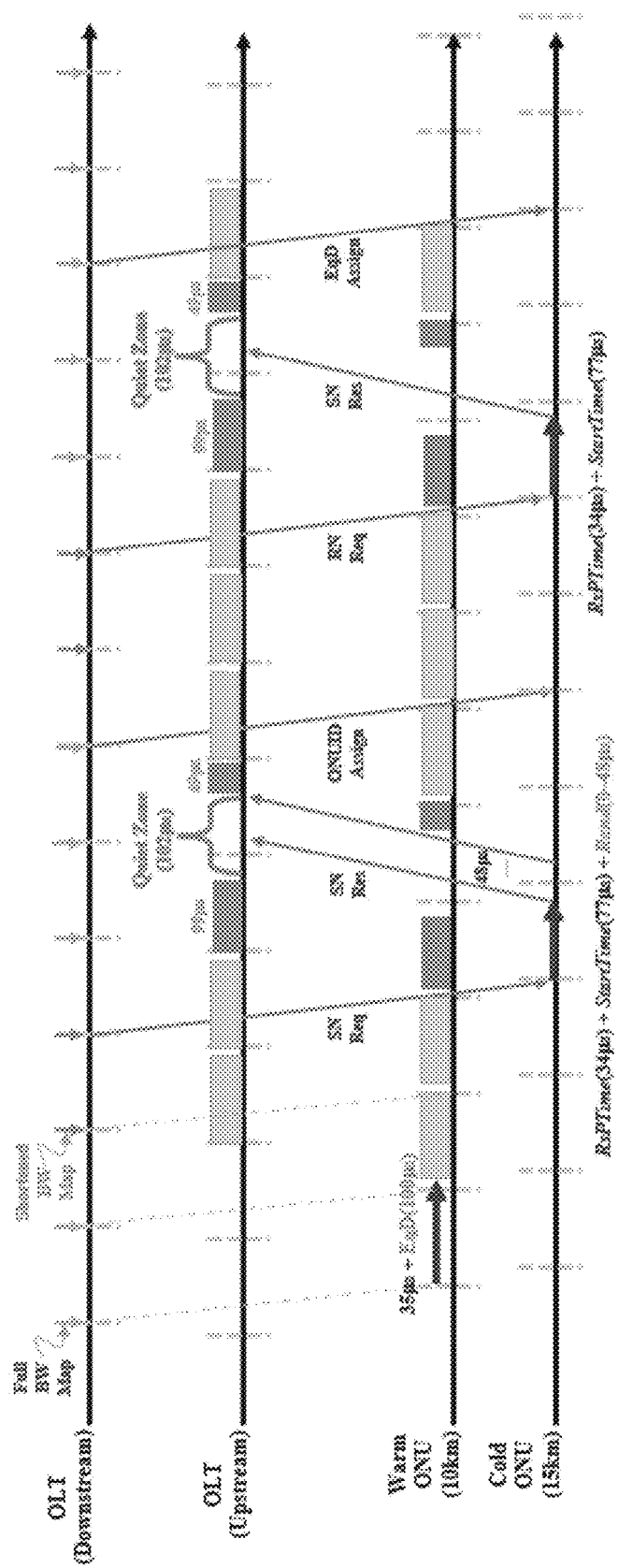
FIG. 8 is a diagram illustrating an ONU activation process in a multi-quiet zone (or zone 3) according to an example embodiment.

FIG. 8 is a diagram illustrating an ONU activation process in a multi-quiet zone (or zone 3) according to an example embodiment.

Referring to FIG. 8, in zone 3, ONUs present at a distance of 10 km to 15 km may be registered. A warm ONU located at a distance of 10 km may be already registered, and thus have 100 µs allocated by an OLT as an equalized delay (EqD). When the warm ONU receives an allocated bandwidth from the OLT, the warm ONU may transmit data to the OLT after 135 µs.

For example, to perform an ONU activation process in zone 3, the OLT may allocate a 99 µs transmission bandwidth map (a shortened BW map) to the warm ONU in a cycle before a multi-quiet zone DBA engine transmits a "serial_number request" (SN Req) map. The OLT may allocate, to the warm ONU, a 49 µs transmission bandwidth map (a shortened BW map) along with the "serial_number request" (SN Req) map. The OLT may transmit the "serial_number request" (SN Req) map and open a quiet zone of a 102 µs length in a next upstream cycle. An ONU that is not registered may transmit an "acknowledgement" (RN Res) PLOAM message for a time between 111 µs and 159 µs. In a case of a cold ONU that is located at a distance of 15 km, an optical fiber delay of 150 µs may occur and it may be transmitted to the OLT after the optical fiber delay of 150 µs. The OLT may discover ONUs located at a distance of 10 km and 15 km by opening the quiet zone of the 102 µs length after 99 µs.

When the cold ONU is discovered, the OLT may allocate an ONU-ID through an "assign_ONUID" (ONUID Assign) PLOAM message. The OLT may allocate a 99 µs transmission bandwidth map (a shortened BW map) to the warm ONU in a cycle before multi-quiet zone DBA engine transmits a "ranging request" (RN Req) map. The OLT may allocate, to the warm ONU, a 49 µs transmission bandwidth map (a shortened BW map) along with the "ranging request" (RN Req) map. The OLT may transmit the "ranging request" (RN Req) map to the OLT and open the quiet zone of the 102 µs length in a next upstream cycle.

The ONU may transmit an "acknowledgement" (RN Res) message after 111 µs without a random delay. The OLT may measure a distance from a time when the "ranging request" (RN Req) map is transmitted to a time when the "acknowledgement" (RN Res) PLOAM message is received. The OLT may calculate a distance with the cold ONU by subtracting a time of 111 µs from the measured distance. The OLT may transmit an equalized delay (EqD) to the cold ONU using the calculated distance.

As described above, the 102 µs quiet zone may be used after 99 µs to register an ONU in zone 3, and the multi-quiet zone DBA engine may additionally allocate the 99 µs and 49 µs bandwidth maps (shortened bandwidth maps) in the quiet zone.

Figure 9:
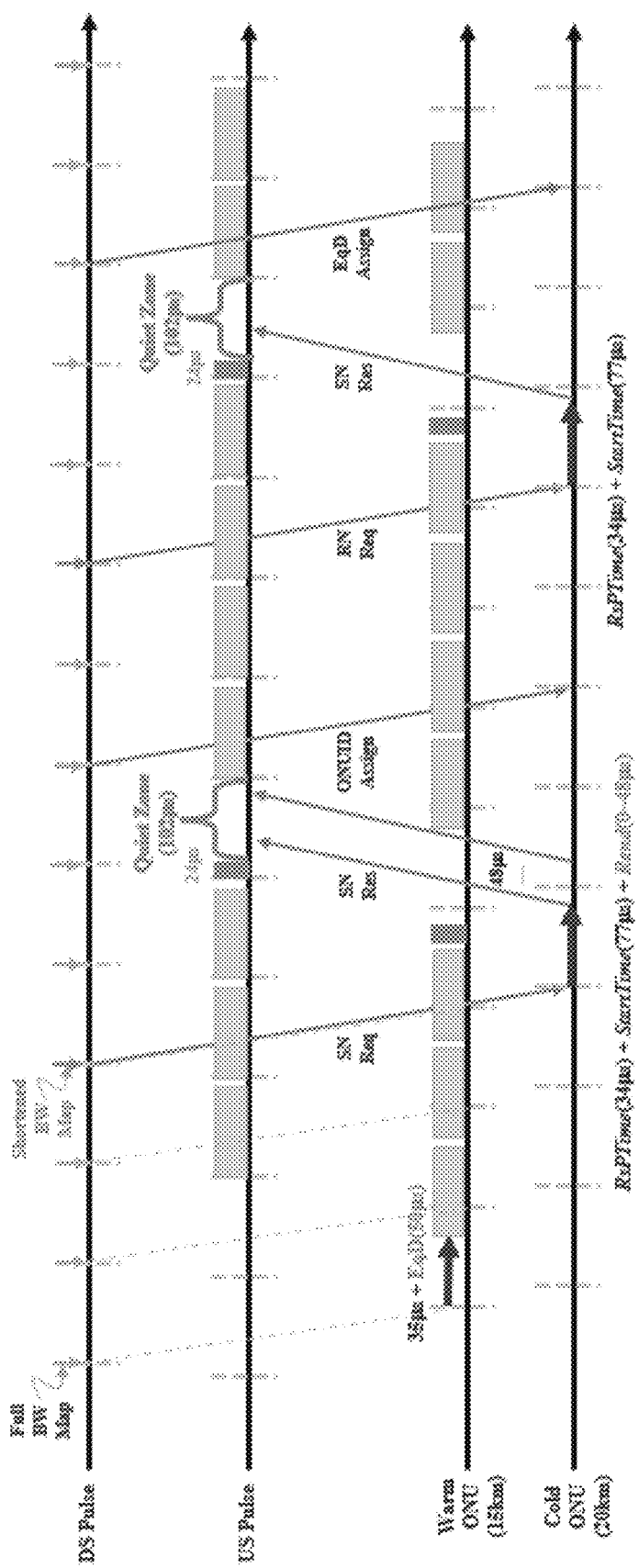
FIG. 9 is a diagram illustrating an ONU activation process in a multi-quiet zone (or zone 4) according to an example embodiment.

FIG. 9 is a diagram illustrating an ONU activation process in a multi-quiet zone (or zone 4) according to an example embodiment.

Referring to FIG. 9, in zone 4, ONUs present at a distance of 15 km to 20 km may be registered. A warm ONU located at 15 km may be already registered, and thus have 50 µs allocated by an OLT as an adjusted distance value. When the warm ONU receives an allocated bandwidth from the OLT, the warm ONU may transmit data to the OLT after 85 µs.

For example, to perform an ONU activation process in zone 4, the OLT may transmit, to the warm ONU, a 24 µs transmission bandwidth map (shortened BW map) along with a "serial_number request" (SN Req) map through a multi-quiet zone DBA engine. The OLT may transmit the "serial_number request" (SN Req) map and open a quiet zone of a 101 μs length in a second upstream cycle. An ONU that is not registered may transmit a "serial_number response" (RN Res) PLOAM message for a time between 111 μs and 159 μs. In a case of a cold ONU that is located at a distance of 20 km, an optical fiber delay of 200 μs may occur and it may be transmitted to the OLT after the optical fiber delay of 200 μs. The OLT may discover ONUs located at a distance of 15 km to 20 km by opening the quiet zone with the 102 μs length after 149 μs.

When the cold ONU is discovered, the OLT may allocate an ONU-ID through an "assign_ONUID" (ONUID Assign) PLOAM message. The multi-quiet zone DBA engine may allocate, to the warm ONU, the 24 μs transmission bandwidth map (a shortened BW map) along with a "ranging request" (RN Req) map. The OLT may transmit the "ranging request" (RN Req) map and open the quiet zone of the 101 μs length in the second upstream cycle.

The ONU may transmit the "acknowledgement" (RN Res) message after 111 μs without a random delay. The OLT may measure a distance from a time when the "ranging request" (RN Req) map is transmitted to a time when the "acknowledgement" (RN Res) PLOAM message is received. The OLT may calculate a distance with the cold ONU by subtracting a time of 111 μs from the measured distance. The OLT may transmit an adjusted distance value to the cold ONU using the calculated distance.

As described above, the 102 μs quiet zone may be used after 149 μs to register an ONU in zone 4, and the multi-quiet zone DBA engine may allocate the 125 μs (full) and 24 μs (shortened) bandwidth maps in the quiet zone.

Figure 10:
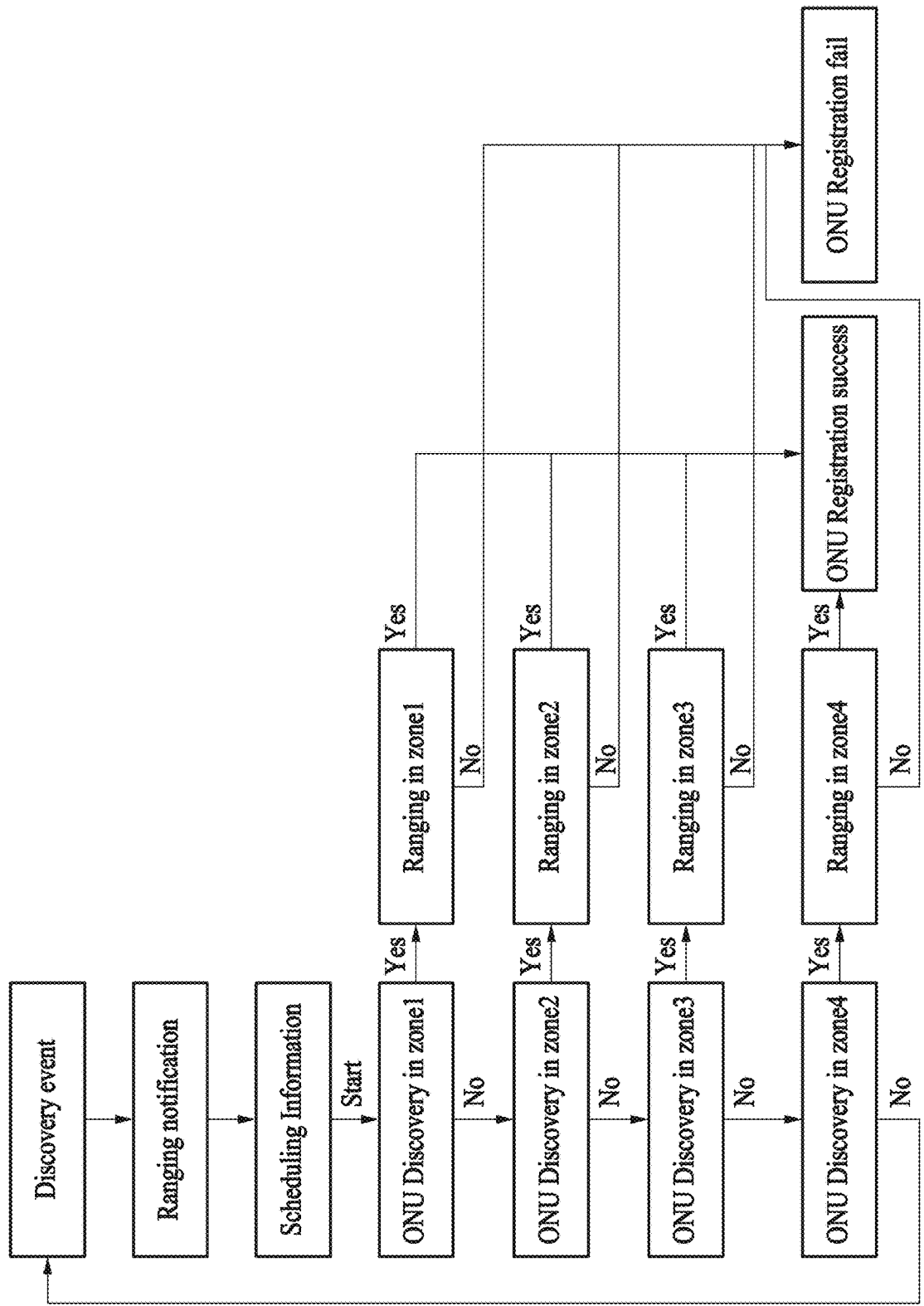
FIG. 10 is a diagram illustrating a flow of operations in a multi-quiet zone according to an example embodiment.

FIG. 10 is a flowchart illustrating a flow of operations in a multi-quiet zone according to an example embodiment.

Referring to FIG. 10, when a discovery event occurs in an OLT, the OLT may transmit a ranging notification to a CU/DU. When scheduling information for ranging is input from the CU/DU, an ONU activation process may begin.

The OLT may attempt to discover an ONU in zone 1. When the ONU is not discovered, the OLT may move to zone 2. However, when the ONU is discovered, ranging (or distance measurement) may be performed in zone 1. When ranging is successfully performed in zone 1, registration of the ONU may be completed. When ranging is not successfully performed in zone 1, the registration of the ONU may not be completed.

The OLT may attempt to discover an ONU in zone 2. When the ONU is not discovered, the OLT may move to zone 3. However, when the ONU is discovered in zone 2, ranging may be performed in zone 2. When ranging is successfully performed in zone 2, registration of the ONU may be completed. When ranging is not successfully performed, the registration of the ONU may not be completed.

The OLT may attempt to discover an ONU in zone 3. When the ONU is not discovered, the OLT may move to zone 4. However, when the ONU is discovered in zone 3, ranging may be performed in zone 3. When ranging is successfully performed in zone 3, registration of the ONU may be completed. When ranging is not successfully performed, the registration of the ONU may not be completed.

The OLT may attempt to discover an ONU in zone 4. When the ONU is not discovered, the OLT may terminate the process without discovering an ONU. However, when the ONU is discovered in zone 4, ranging may be performed in zone 4. When ranging is successfully performed in zone 4, registration of the ONU may be completed. When ranging is not successfully performed, the registration of the ONU may not be completed.

The OLT may sequentially move from zone 1 through zone 4 until an ONU is discovered. When the ONU is discovered in each zone, the ranging process may be performed, and the registration of the discovered ONU may be completed.

According to example embodiments described herein, it is possible to provide a ranging collaboration between an OLT and a CU/DU through a multi-quiet zone DBA engine, guarantee low-latency (e.g., 102 μs) by providing a single quiet zone as a plurality of short quiet zones based on the collaboration, and thus provide a wired service and a wireless service in a single PON.

It is also possible to classify each multi-quiet zone with an ONU-ID value, and thus provide mutual coexistence between an ONU that uses a multi-quiet zone and an existing ONU in a single PON.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

In the meantime, the method according to an example embodiment may be implemented as various recording media such as a magnetic storage medium, an optical read medium, and a digital storage medium after being implemented as a program that can be executed in a computer.

The implementations of the various technologies described in the specification may be implemented with a digital electronic circuit, computer hardware, firmware, software, or the combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. The computer programs such as the above-described computer program(s) may be recorded in any form of a programming language including compiled or interpreted languages, and may be executed as a standalone program or in any form included as another unit suitable to be used in a module, component, sub routine, or a computing environment. The computer program may be executed to be processed on a single computer or a plurality of computers at one site or to be distributed across a plurality of sites and then interconnected by a communication network.

The processors suitable to process a computer program include, for example, both general purpose and special purpose microprocessors, and any one or more processors of a digital computer of any kind. Generally, the processor may receive instructions and data from a read only memory, a random-access memory or both of a read only memory and a random-access memory. The elements of a computer may include at least one processor executing instructions and one or more memory devices storing instructions and data. In general, a computer may include one or more mass storage devices storing data, such as a magnetic disk, a magneto-optical disc, or an optical disc or may be coupled with them so as to receive data from them, to transmit data to them, or to exchange data with them. For example, information carriers suitable to embody computer program instructions and data include semiconductor memory devices, for example, magnetic Media such as hard disks, floppy disks, and magnetic tapes, optical Media such as compact disc read only memory (CD-ROM), and digital video disc (DVD), magneto-optical media such as floppy disks, ROM, random access memory (RAM), flash memory, erasable programmable ROM (EPROM), electrically erasable programmable ROM (EEPROM), and the like. The processor and the memory may be supplemented by a special purpose logic circuit or may be included by the special purpose logic circuit.

Furthermore, the computer-readable medium may be any available medium capable of being accessed by a computer and may include a computer storage medium.

Although the specification includes the details of a plurality of specific implementations, it should not be understood that they are restricted with respect to the scope of any invention or claimable matter. On the contrary, they should be understood as the description about features that may be specific to the specific example embodiment of a specific invention. Specific features that are described in this specification in the context of respective example embodiments may be implemented by being combined in a single example embodiment. On the other hand, the various features described in the context of the single example embodiment may also be implemented in a plurality of example embodiments, individually or in any suitable sub-combination. Furthermore, the features operate in a specific combination and may be described as being claimed. However, one or more features from the claimed combination may be excluded from the combination in some cases. The claimed combination may be changed to sub-combinations or the modifications of sub-combinations.

Likewise, the operations in the drawings are described in a specific order. However, it should not be understood that such operations need to be performed in the specific order or sequential order illustrated to obtain desirable results or that all illustrated operations need to be performed. In specific cases, multitasking and parallel processing may be advantageous. Moreover, the separation of the various device components of the above-described example embodiments should not be understood as requiring such the separation in all example embodiments, and it should be understood that the described program components and devices may generally be integrated together into a single software product or may be packaged into multiple software products.

In the meantime, example embodiments of the present invention disclosed in the specification and drawings are simply the presented specific example to help understand an example embodiment of the present invention and not intended to limit the scopes of example embodiments of the present invention. It is obvious to those skilled in the art that other modifications based on the technical idea of the present invention may be performed in addition to the example embodiments disclosed herein.

What is claimed is:

1. A method of registering a new optical network unit (ONU) by an optical line terminal (OLT) in an environment where a wired service and a wireless service are concurrently provided, through a single passive optical network (PON), the method comprising:

transmitting a ranging notification message to a centralized unit (CU)/distributed unit (DU) to register the new ONU;

receiving scheduling information for registering the new ONU from the CU/DU in response to the ranging notification message;

based on the received scheduling information, transmitting a serial number request message to each of service regions in which ONUs are present for the wired service and the wireless service; and when a serial number response message is received from the new ONU in response to the serial number request message, registering the new ONU that transmits the serial number response message, wherein the transmitting of the serial number request message is performed through a multi-quiet zone, wherein the multi-quiet zone is configured to include a plurality of quiet zones by dividing a single quiet zone into the plurality of quiet zones having shorter periods to satisfy a low latency required in the wireless service.

2. The method of claim 1, wherein each quiet zone in the multi-quiet zone comprises a minimum response time variation of an ONU, a random delay time, an optical fiber transmission time, and a distance variation time for adjusting a variation that is based on a distance of the ONU.

3. The method of claim 1, wherein the CU/DU is configured to provide the scheduling information such that a radio unit (RU) does not transmit data to the OLT in a quiet zone interval in which registration of the new ONU is performed.

4. The method of claim 1, wherein the serial number request message comprises an identifier (ID) for identifying each of the service regions that are classified based on distances between the OLT and each of the ONUs, wherein the new ONU present in the service region is configured to transmit the serial number response message to the OLT in response to the serial number request message comprising the ID corresponding to a location of the new ONU.

5. The method of claim 1, wherein, when the serial number request message is received from the OLT, the new ONU is configured to transmit the serial number response message to the OLT after a minimum response time and, a random delay time.

6. The method of claim 1, wherein the registering of the new ONU comprises:

allocating, an identifiable ID to the new ONU that transmits the serial number response message; and completing the registering of the new ONU by measuring a distance to the new ONU to which the ID is allocated and allocating an adjusted value.

7. An optical line terminal (OLT) in an environment where a wired service and a wireless service are concurrently provided through a single passive optical network (PON), comprising:

a processor, wherein the processor is configured to:

transmit a ranging notification message to a centralized unit (CU)/distributed unit (DU) to register a new optical network unit (ONU);

receive scheduling information for registering the new ONU from the CU/DU in response to the ranging notification message;

based on the scheduling information, transmit a serial number request message to each of service regions in which ONUs are present for the wired service and the wireless service, wherein the transmitting of the serial number request message is performed through a multi-quiet zone, wherein the multi-quiet zone is configured to include a plurality of quiet zones by dividing a single quiet zone into the plurality of quiet zones having shorter periods to satisfy a low latency required in the wireless service; and when a serial number response message is received from the new ONU in response to the serial number request message, register the new ONU that transmits the serial number response message.

8. The OLT of claim 7, wherein each quiet zone in the multi-quiet zone comprises a minimum response time variation of an ONU, a random delay time, an optical fiber transmission time, and a distance variation time for adjusting a variation that is based on a distance of the ONU.

9. The OLT of claim 7, wherein the CU/DU is configured to provide the scheduling information such that a radio unit (RU) does not transmit data to the OLT in a quiet zone interval in which registration of the new ONU is performed.

10. The OLT of claim 7, wherein the serial number request message comprises an identifier (ID) for identifying each of the service regions that are classified based on distances between the OLT and each of the ONUs, wherein the new ONU present in the service region is configured to transmit the serial number response message to the OLT in response to the serial number request message comprising the ID corresponding to a location of the new ONU.

11. The OLT of claim 7, wherein, when the serial number request message is received from the OLT, the new ONU is configured to transmit the serial number response message to the OLT after a minimum response time and a random delay time.

12. The OLT of claim 7, wherein the processor is configured to:

allocate an identifiable ID to the new ONU that transmits the serial number response message, and complete the registering of the new ONU by measuring a distance to the new ONU to which the ID is allocated and allocating an adjusted value.

\* \* \* \* \*